No. 736,057. PATENTED AUG. 11, 1903.
A. BEATTY.
HOSE AND PIPE COUPLING.
APPLICATION FILED OCT. 2, 1902.
NO MODEL. 2 SHEETS—SHEET 2.
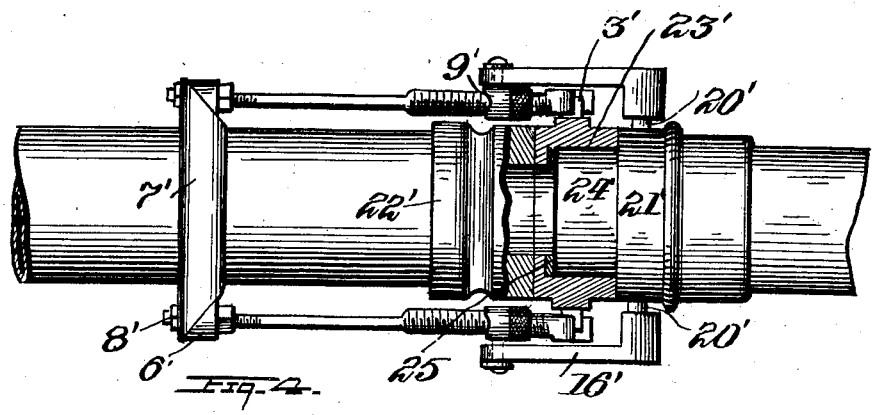
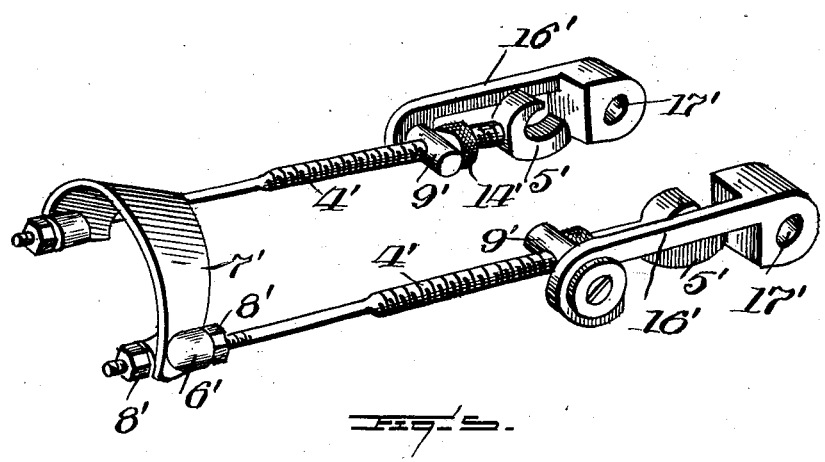
Witnesses:
Inventor:
Albert Beatty,
By his Attorneys No. 736,057. Patented August 11, 1903.

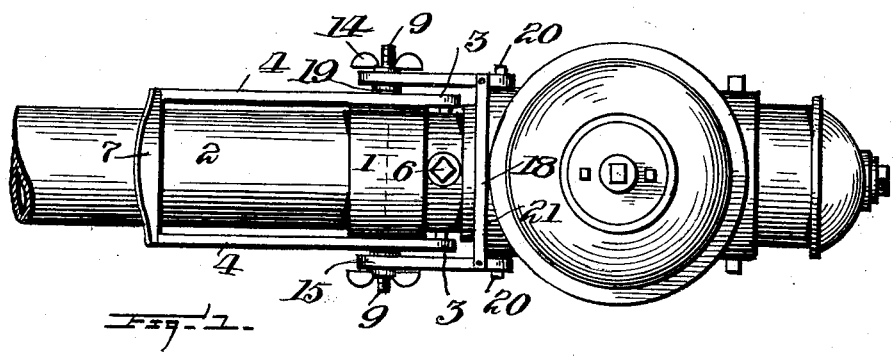
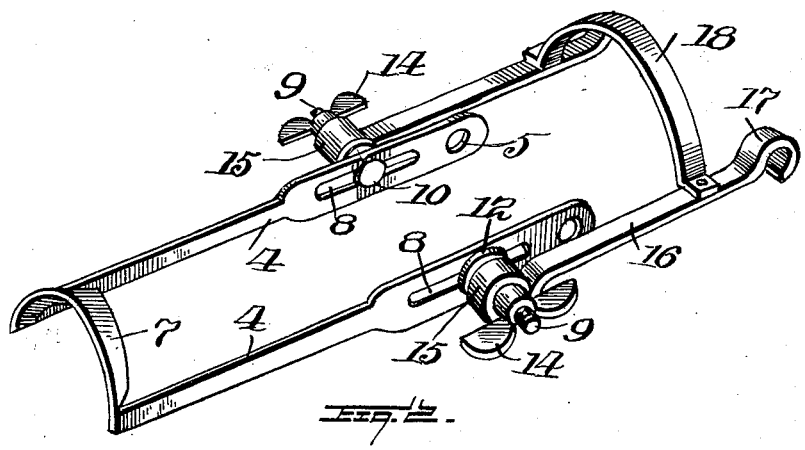
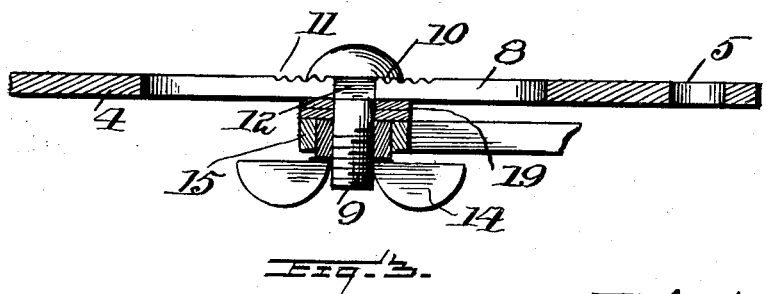

UNITED STATES PATENT OFFICE.

ALBERT BEATTY, OF PITTSBURG, PENNSYLVANIA.

HOSE AND PIPE COUPLING.

SPECIFICATION forming part of Letters Patent No. 736,057, dated August 11, 1903.

Application filed October 2, 1902. Serial No. 125,697. (No model.)

*To all whom it may concern:*

Be it known that I, ALBERT BEATTY, a citizen of the United States of America, residing at Pittsburg, in the county of Allegheny and State of Pennsylvania, have invented certain new and useful Improvements in Hose and Pipe Couplings, of which the following is a specification, reference being had therein to the accompanying drawings.

This invention relates to certain new and useful improvements in hose and pipe couplings; and the invention has for its object to provide a coupling particularly adapted for connecting suction-hose to a fire-plug or to an engine and for use in coupling sections of a water-line hose together in an efficient manner as well as in an extremely short space of time.

The invention relates to that class of devices in which eccentrics or levers are used for forcing the abutting ends of the hose into intimate union or for forcing the coupling on the end of the suction-hose into union with the coupling of the fire-plug or fire-engine.

In describing the invention in detail reference is had to the accompanying drawings, forming a part of this specification, and wherein like numerals of reference indicate like parts throughout the several views, in which—

Figure 1 is a top plan view of my improved hose-coupler, showing the same applied in position for coupling a suction-hose up to the fire-plug. Fig. 2 is a detail perspective view of the form of coupling employed in connection with the suction-hose detached therefrom. Fig. 3 is a longitudinal sectional view of a part of one of the lever-arms. Fig. 4 is a top plan view of a modified form of coupling, more particularly adapted for coupling sections of water-line hose together, a portion of the union between the two sections of hose being in section. Fig. 5 is a detail perspective view of the form of coupling shown in Fig. 4 detached from the hose.

Heretofore it has generally been the practice to connect the suction-hose which leads from the fire-plug to the fire-engine by means of set-screws which fasten the union or coupling carried by the suction-hose to the fire-plug, and similarly the other end of the suction-hose is connected to the pump of the engine. This operation is comparatively slow, it requiring a wrench to make the coupling, and as it is of extreme importance in case of fire that the engine be coupled up to the water-supply at the very earliest possible moment and always preferably by the time the water-line hose is reached for use it is the object of my invention to provide means whereby this coupling may be quickly effected. To this end I provide in opposite sides of the union 1, carried by the end of the suction-hose 2, studs or pins 3, which act as trunnions for a pair of lever-arms 4, provided adjacent to their inner end with openings or eyes 5 to receive the studs or pins 3. In Fig. 1 I show the union 1 provided with set-screws 6, employed for fastening this union to the fire-plug in the ordinary manner. With my invention I do not change the union in this respect and do not require the removal therefrom even of the set-screws 6. The studs or pins 3 may be threaded or tapped into the opposite sides of the union at very small cost and when not in use may be removed or cut off, and the union remains in its original form. The lever-arms 4 are connected together at the forward end by a connector bar or strap 7, which forms a grip for operating the lever-arms 4, and to this end it is preferably slightly inclined—that is, one edge thereof lying on a plane below the other edge—whereby the fingers may be inserted under the bar between the same and the hose in order to permit the uncoupling of the device, and this bar also serves as an element on which pressure may be exerted to force the coupling into the coupled position. The lever-arms 4 are each provided near their inner ends with a slot 8, in which is mounted the adjustable bolt 9. The head of this bolt is preferably provided on its inner face with serrations or teeth 10, which engage with the serrated or toothed inner face 11 of the bars 4, which serrated or toothed portion is above and below the slot 8. The shank of the bolt 9 has a square or rectangular portion 12, which fits in the slot 8, and the bolts are held in position by means of a suitable nut—such, for instance, as a wing-nut 14. (Shown in the present illustration.) In the present showing I have illustrated the bur of the wing-nut as receiving and forming the bearing for the eyes 15, formed on the end of the drop-levers 16, these levers being provided at their outer ends with a hook 17 and connected together near their outer ends by the connector bar or strap 18, attached to the levers in any suitable manner. In order to space the drop-lever 16 a suitable distance away from the levers 4, I provide washers 19 on the bolts 9, as clearly seen in Figs. 1 and 3 of the drawings. The hooked ends 17 of the levers 16 are adapted to engage above the studs or pins 20, which are threaded or tapped into the nipple of the fire-plug 21. With this construction just described it will be evident that the manner of connecting may be reversed—that is, the hooks, which are shown on the ends of the drop-levers 16, may be provided on the ends of the levers 5 and eyes provided in lieu of hooks on the ends of the drop-levers. In the present showing, however, it will be observed that the coupling is carried by the suction-hose, and when it is desired to couple the said hose to the fire-plug the lever-arms 4 are moved to a substantially V position, which will permit the engagement of the hooks 17 with the studs or pins 20, and as the lever-arms 4 are forced downwardly into the locked position by pressure upon the connecting-bar 7 the nipple of the union will be forced into engagement with the nipple of the plug, the one inclosing the other, and as the lever-arms 4 reach the horizontal position, or slightly past the horizontal position, the coupling is securely and effectually locked to the plug. It will be observed that by simply loosening the wing-nuts 14 and shifting the bolts 9 in the slots 8 toward the inner end of the lever-arms and toward the outer ends thereof the force with which the one union is engaged with the other is varied.

In Figs. 4 and 5 I show the same embodiment of my invention with but slightly-different construction more particularly adapted for use in connecting water-line hose, though either the construction shown in these views or that shown in Figs. 1, 2, and 3 may be employed for connecting the suction-hose to the fire-plug and to the engine and also for connecting water-line hose. In the showing in Figs. 4 and 5 the drop-levers 16' are shown provided on their ends with bosses 17', having openings therethrough to engage the studs or pins 20', which are threaded or tapped into opposite sides of the union 21'. In the ordinary manner of connecting water-line hose together the section 22' of the union carries a rotatable ring 23', and the section 21' carries an extension or nipple 24'. The coupling is ordinarily made by having the nipple 24' threaded to engage with the threads of the interior of the rotatable ring 23', a wrench, usually in the form of a spanner-wrench, being employed for rotating this ring to join the union together. For accommodation of this spanner-wrench the ring 23' is provided with studs or pins 3', and I therefore employ these pins or studs without change in connection with my improved coupler. Where the coupling is manufactured especially, the threads on the nipple 24 and those in the ring 3 will be dispensed with, and where my improved coupling is to be applied to the union already constructed I may remove the threads from the interior of the ring, which will permit the nipple 24 to enter the ring without threading. The other ends of the drop-levers 16' are pivotally connected to trunnion-burs 9', through which operate the threaded rods 4', serving the purpose of the lever-arms for effecting the coupling. These rods are provided with grips 5' at their inner ends, which have seats to receive the studs or pins 3', and the rods at their outer ends are threaded through bosses 6', carried by the connecting bar or strap 7', which is of a similar form of construction to the connecting bar or strap 7 and is held on the rods 4 by nuts 8' at each side of the bosses 6'. Adjustment of the rods 4', comprising the lever-arms in this construction, is had by means of the adjusting-nuts 14', mounted on the said rods 4' between the trunnion-bur 9' and the grip ends 5' of said rods.

In operation of this device the ends 17' of the drop-levers 20 are engaged with the studs or pins 20', and the grip ends 5' engage with the studs or pins 3'. When the lever-arms 4' are forced downwardly to the horizontal position by pressure on the connecting-bar 7', the nipple end 24' is drawn into the ring 23' in sliding engagement with a gasket 25', usually arranged within the ring 23'. By adjustment of the nuts 14' the lever-arms 4' may be adjusted so as to regulate the adjustment or to take up wear on the gasket or washer 25'.

The coupling, it will be observed, is carried by the one section of the hose when the device is uncoupled, and the insertion of the other section of the hose into position and the forcing down of the lever-arms are all that is required to effect the coupling.

Having fully described my invention, what I claim as new, and desire to secure by Letters Patent, is—

1. In a device of the character described, the combination of a coupling for a hose and pins carried thereby, of a fire-plug having a nipple, lugs on said nipple, a pair of levers adapted to engage said lugs, said levers pivotally secured to a second pair of levers, adjusting means for the latter levers for varying the relation between the first and second pair of the same, said second pair of levers adapted to engage the pins on the coupling, substantially as described.

2. In a device of the character described, the combination of a union for a hose, lugs formed thereon, of a fire-plug having a nipple, provided with outwardly-extending pins, a pair of lever-arms adapted to engage the lugs of the union, slots formed in said arms, teeth formed in the arms on the slotted portion of the same, a pair of drop-levers adapted to engage the said pins of said nipple, drop-levers pivotally secured to said lever-arms and means for adjusting the relation of the lever-arms and drop-levers, comprising a bolt, teeth formed on the head thereof, said bolt adapted to engage in the slots of the lever-arms, the teeth thereof adapted to engage the teeth on the arms to lock the same in an adjusted position, substantially as described.

3. In a device of the type set forth, the combination of a pair of lever-arms, enlarged flattened portions thereon, perforations in the ends thereof for engagement with lugs, slots in said enlarged portions, teeth formed on the inner faces of said portions throughout the length of the slots, a pair of drop-levers, means for pivotally securing the same to the lever-arms, and adjusting means for varying the relation of said drop-levers and lever-arms, comprising a headed bolt passing through said drop-levers, and engaging in the slots of the enlarged portions of the lever-arms, teeth upon the head of said bolt, and means for holding the said teeth in engagement with the teeth on the lever-arms, substantially as described.

4. The combination of a fire-plug having a nipple with lugs thereon, of a coupling or union for a hose and pins thereon, of a bracket comprising a pair of lever-arms adapted to engage the pins of the coupling, a pair of drop-levers adapted to engage the lugs on said nipple, said lever-arms and drop-levers pivotally and adjustably secured together, means for securing an adjustment of the relation of said lever-arms and drop-levers, these two members of the bracket comprising slots formed in the lever-arms, teeth upon the inner surfaces of said lever-arms along the length of the slot, a headed bolt adapted to pass through the drop-levers and engage in said slots, teeth upon the under face of said bolt to engage with those of the lever-arms, and means for holding the teeth in engagement with each other, in any desired position of said lever-arms and drop-levers, substantially as described.

In testimony whereof I affix my signature in the presence of two witnesses.

ALBERT BEATTY.

Witnesses:
A. M. WILSON,
KARL H. BUTLER.